(No Model.)

R. E. BOSCHERT.
RACK FOR WINE OR CIDER PRESSES.

No. 368,056. Patented Aug. 9, 1887.

WITNESSES:
A. F. Walz,
C. Bendixow.

INVENTOR:
Rufus E. Boschert
BY
Duell, Laass & Duell
ATTORNEYS.

UNITED STATES PATENT OFFICE.

RUFUS E. BOSCHERT, OF SYRACUSE, NEW YORK.

RACK FOR WINE OR CIDER PRESSES.

SPECIFICATION forming part of Letters Patent No. 368,056, dated August 9, 1887.

Application filed December 20, 1886. Serial No. 222,052. (No model.)

*To all whom it may concern:*

Be it known that I, RUFUS E. BOSCHERT, of Syracuse, in the county of Onondaga, in the State of New York, have invented new and useful Improvements in Racks for Wine or Cider Presses, of which the following, taken in connection with the accompanying drawings, is a full, clear, and exact description.

This invention relates to racks which are interposed between the layers of pomace in wine or cider presses.

The invention consists, essentially, of a rack composed of an upper and a lower section firmly united and provided in its upper surface with a series of channels running completely across the rack and at right angles to a series of channels running completely across the bottom surface, and having a solid central portion between the grooved portions of the two sections, thereby retaining the desired stiffness and stability in the rack, and obtaining other advantages, as hereinafter set forth.

Figure 1:
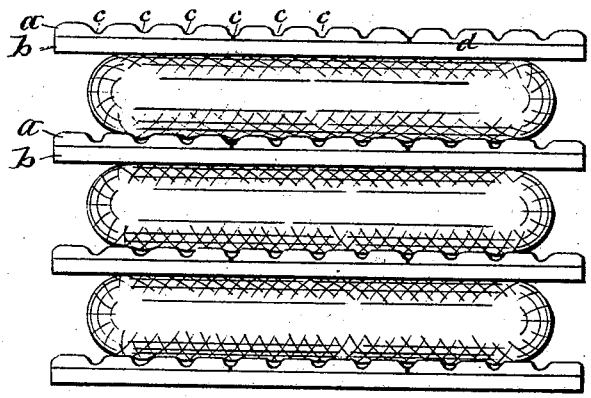
Figure 2:
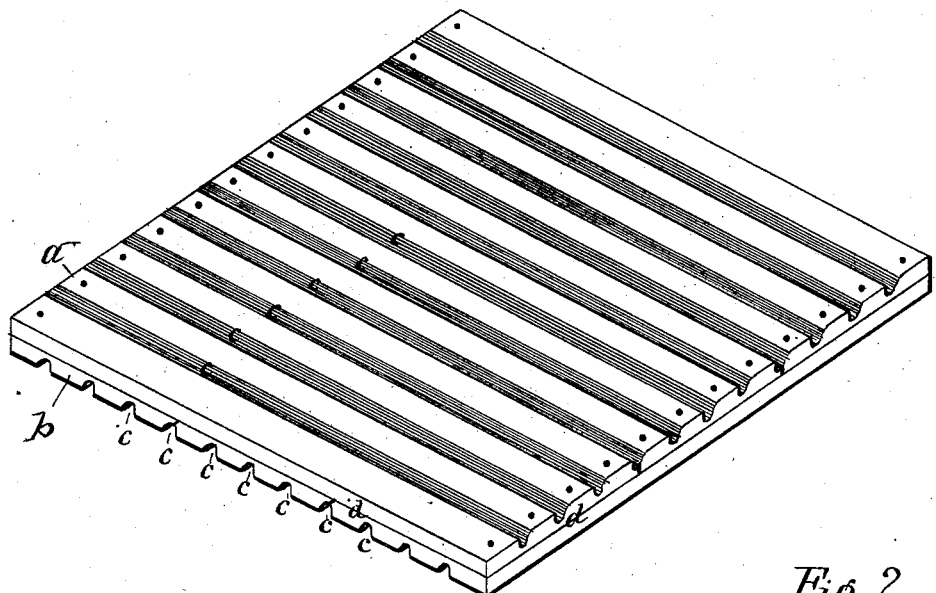

In the accompanying drawings, Figure 1 is a side elevation of a tier of my improved racks with the intervening pomace; and Fig. 2 is a detached isometric view of one of the racks.

My improved rack is composed of top and bottom sections, $a$ and $b$, each consisting either of a single board of the width and length of the rack or of a series of boards of the requisite length and fitted with their edges closely side by side. The two sections of the rack are placed with the grain of the wood in one running transverse or at right angles to the grain of the wood in the other section, and are firmly secured to each other by nails or other suitable means. Said rack has its top and bottom surfaces each provided with a series of channels, $c\ c$, which run lengthwise the grain of the wood and completely across the rack, and consequently the channels on the top surface run transverse or at right angles to those in the bottom surface, said channels extending only part way of the depth of the respective sections of the rack and leaving a solid central portion, $d$, in the rack. This solid portion not only adds to the stability of the rack, but also serves to keep the liquor expressed from one layer of pomace separate from the adjacent layer, and the rack is devoid of interstices liable to retain more or less liquor, which would be absorbed by the compressed pomace after it is relieved from pressure. One of the chief advantages of this rack is the convenience of cleaning it, it having no crevices in which pomace or other substance can be retained and allowed to accumulate. The rack being solid and having comparatively shallow grooves in its surfaces allows it to be swept easily and washed perfectly clean. Furthermore, it will be observed that my improved rack is reversible or adapted to be placed with either side up to carry off the cider expressed from the superincumbent pomace; hence said rack is more convenient than racks of the ordinary construction.

Having described my invention, what I claim as new, and desire to secure by Letters Patent, is—

The improved rack composed of an upper and a lower section firmly united and provided in its upper surface with a series of channels running completely across the rack and at right angles to a series of channels running completely across the bottom surface, and having a solid central portion between the grooved portions of the two sections, substantially as described and shown.

In testimony whereof I have hereunto signed my name and affixed my seal, in the presence of two attesting witnesses, at Syracuse, in the county of Onondaga, in the State of New York.

RUFUS E. BOSCHERT. [L. S.]

Witnesses:
H. P. DENISON,
C. BENDIXON.